United States Patent [19]

Chihara et al.

[11] Patent Number: 5,115,007
[45] Date of Patent: May 19, 1992

[54] ABRASION RESISTANT POLYURETHANE BLEND COMPOSITIONS

[75] Inventors: Kohji Y. Chihara, Hudson; Gerd M. Lenke, Canton, both of Ohio

[73] Assignee: GenCorp Inc., Fairlawn, Ohio

[21] Appl. No.: 658,730

[22] Filed: Feb. 21, 1991

Related U.S. Application Data

[63] Continuation-in-part of Ser. No. 443,413, Nov. 30, 1989, abandoned.

[51] Int. Cl.⁵ .................................................. C08K 5/54
[52] U.S. Cl. ............................ 524/267; 428/424.2; 428/425.6
[58] Field of Search .................. 524/267; 428/424.2, 428/424.8, 424.9

[56] References Cited

U.S. PATENT DOCUMENTS

4,898,919  2/1990  Ueda et al. ......................... 525/440

FOREIGN PATENT DOCUMENTS

59-201838  11/1984  Japan .
60-173011   3/1985  Japan .
62-41215    5/1987  Japan .
63-130616  11/1988  Japan .
64-6017     4/1989  Japan .

Primary Examiner—Paul R. Michl
Assistant Examiner—Edward Cain

[57] ABSTRACT

The present invention relates to a primerless, one-part, storage stable, fast heat curable, abrasion-resistant coating composition useful as a low friction coating for an EPDM glass run channel in vehicles or similar applications. The coating composition comprises a blocked polyurethane prepolymer, a coreactive crosslinking agent, and a compatible silicone oil. The blocked polyurethane is desirably made from a hydroxyl terminated hydrogenated diene polymer or polyolefin, which is reacted with excess equivalents of a polyisocyanate reactant and the isocyanate groups blocked with a blocking agent. The cured polyurethane has very good abrasion resistance.

30 Claims, No Drawings

ABRASION RESISTANT POLYURETHANE BLEND COMPOSITIONS

CROSS-REFERENCE

This application is a Continuation-In-Part of U.S. Ser. No. 07/443,413, filed Nov. 30, 1989 now abandoned, for "Abrasion Resistant Polyurethane Blend Compositions."

FIELD OF THE INVENTION

The present invention relates to a primerless, one-part, storage-stable, fast heat-curable, abrasion resistant coating composition which is useful as low friction, environmentally stable coatings for elastomeric substrates and, more particularly, for weatherstrip substrates, including an automotive window glass run channel made from ethylene-propylene-diene polymers (EPDM). More specifically, the present invention relates to coating compositions made from a blocked polyurethane prepolymer derived from hydroxy terminated hydrogenated diene polymers or polyolefins, a crosslinking agent, silicone oil, and a non-reactive solvent or diluent.

BACKGROUND OF THE INVENTION

Heretofore, an EPDM glass run channel used in automobiles ordinarily have been napped or coated in an effort to provide high abrasion resistance, low friction, and good release properties. Napping, however, requires electrostatic fiber planting, a costly process, while prior art coatings have been deficient in physical properties. For example, moisture curable polyether-polyurethane and polyester-polyurethane based coatings containing silicone oil provide abrasion resistance, but are difficult to control with respect to quality and application, because of lack of curing agents, and require a primer coating and/or surface treatment on the EPDM glass run channel substrate. Other coatings, such as various polyester-polyurethanes formulated with silicone oil for lubrication exhibit either inadequate abrasion resistance and/or incompatibility between the polyurethane and the silicone oil.

Japanese Patent applications JP 60-173011 (1985), JP 62-41215 (1987), JP 63-130616, and JP 64-6017 (1989), relate to polyurethane compositions made from low molecular weight polyolefin polyols and are directed to adhesives, coatings, and sealants. In Japanese Patent JP 60-179251 (1985), a mixture of a low molecular weight polyolefin polyol and a blocked methylene diphenyl diisocyanate is utilized as an adhesive for splicing an EPDM glass run channel and weather stripping, while JP 60-181137 (1985) suggests that the same composition can be used as an adhesive to obtain adhesion between EPR (ethylene-propylene rubber) and metal as well as between plastics and rubber. JP 61-136528 (1986) relates to a low molecular weight polyolefin polyol mixed with an N-halogenated amide functional compound used as a coating primer for an EPDM glass run channel where the top coat is a polyester-urethane based coating containing silicone oil while JP 61-137735 (1986) discloses the same composition as an adhesive for fiber flocking on an EPDM glass run channel. Japanese patent application JP 60-179470 and patent JP 60-24821 relate to the utilization of greater than 98 percent hydrogenated polyhydroxy polybutadiene as (a) a crosslinking agent, or (b) an additional polyol component in a polyester and/or polyether urethane coating compositions which are applied to flocked substrates to enhance their resistance to abrasion, weathering, and heat. Japanese Application JP 59-201838 relates to a co-extruded rubber product having a sliding surface as well as to a fabrication method therefor, wherein a rubber substrate is coextruded with a sliding surface composition which is a mixture of urethane forming components. Subsequently, the substrate as well as the sliding surface are vulcanized and cured at the same time.

SUMMARY OF THE INVENTION

The mechanically tough, abrasion resistant, low friction thermosetting coating composition of the present invention is based on a polymeric binder system comprising a blocked polyurethane prepolymer produced by reacting a low molecular weight hydroxyl terminated hydrogenated diene polymer or polyolefin, preferably a hydrogenated polydiene, with excess equivalents of polyisocyanate and then blocking the free isocyanate groups, a crosslinking agent coreactive with the blocked polyurethane prepolymer, and from about to about 100 weight parts of silicone oil per 100 weight parts of blocked polyurethane. The coating is applied to the substrate, e.g. EPDM rubber, as a solution or dispersion in a suitable, non-reactive, volatile solvent, e.g. toluene. Optionally, micropowders or fillers, organic solvents, and coloring pigments may be added to the polymeric binder.

DETAILED DESCRIPTION OF THE INVENTION

The abrasion resistant coating compositions of the present invention are based upon a blocked polyurethane prepolymer, a suitable crosslinking agent, such as an amine or a polyol crosslinking agent, and silicone oil.

The blocked polyurethane component is produced by reacting a hydroxyl terminated hydrogenated diene polymer or polyolefin with excess equivalents of diisocyanate, where the resulting free isocyanate end groups are blocked with a suitable blocking agent which will unblock upon heating. Typical diene monomers used to produce the diene polymers are conjugated dienes, having from 4 to 10 carbon atoms, or combinations thereof, such as 1,3-butadiene, isoprene or dimethyl butadienes and the like. The polymerization of the diene monomer, typically, may be done via anionic initiation (e.g. with di-lithium hydrocarbyl initiators) or via free-radical polymerization, e.g. by initiation with hydrogen peroxide, which also introduces hydroxy end groups. In anionic polymerization, OH-end groups are advantageously introduced by reaction of the polymeric carban-ion chain ends with ethylene oxide. These techniques are generally well known. The hydroxy-functional polydienes may be hydrogenated, for example, partially or substantially (i.e., at least 90 percent of the unsaturated sites), and even completely hydrogenated, according to any conventional method known to the art. Complete hydrogenation of various diene polymers such as 1,4-polyisoprene is equivalent to an alternating ethylene/propylene hydrocarbon polymer. The polyolefins are made from monomers having from 2 to 6 carbon atoms such as ethene, propene, and the like. The intermediate hydrocarbon polymers of the present invention have a number average molecular weight from about 500 to 15,000 and preferably from about 1,000 to about 8,000. Intermediates are desirably liquid at room temperature, but can have a melting point up to about 80° C. Preferred intermediates are hydroxyl functional telechelic, completely hydrogenated diene polymers containing 2 to 6 and preferably 2 to 4 hydroxy end groups per polymeric molecule (polymer unit). Preferred hydroxyl functional polyolefins are derived from hydrogenated polybutadiene, poly(butadiene-styrene), polyisoprene, and the like. Particularly preferred intermediates are hydroxy terminated polydienes, which are completely hydrogenated (i.e., have less than or 2 percent unsaturation sites), and contain the desired hydroxyl functionality. Polymers with more than two hydroxyl groups on the average per polymer molecule may be considered as branched or star-type polymers.

The hydroxyl functional polyolefins can also be made by utilizing minor amounts (i.e. up to about 50 mole percent and preferably up to 20 mole percent) of ethylenically unsaturated comonomers such as styrene, vinyl toluene, alpha-methylstyrene, divinylbenzene, and similar aromatic monomers; or vinyl monomers, such as acrylonitrile, methacrylonitrile, vinylidene chloride, and similar aliphatic vinyl monomers; or hydroxyl functional ethylenically unsaturated monomers such as 2-hydroxyl ethyl acrylate and methacrylate, 2-hydroxy propyl acrylate and methacrylate and similar hydroxy alkyl acrylates. Regardless of the type of intermediate polyolefin, it should contain at least 1.5 hydroxyl groups from about 1.8 to about 6 hydroxyl groups per average molecule, desirably from about 1.8 to about 2.3, and preferably from about 1.9 to about 2.1 hydroxyl groups.

An especially preferred intermediate polyolefin is a hydrogenated butadiene polymer. Such an intermediate is commercially available as Polytail H and Polytail HA from Mitsubishi Kasei Corp. It has the very generalized structure:

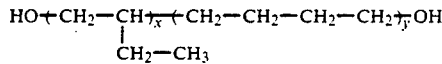

wherein X and Y are randomly distributed and the structure can contain additional —OH groups, and the X/Y ratio, the -OH number per polymeric molecule, the physical state at 25° C., and the melting points are as follows:

|  | Polytail H | Polytail HA | Preferred Range |
|---|---|---|---|
| X/Y | 2/8 | 9/1 | 0.10 to 10.0 |
| OH Number* | 2.3 | 1.8 | 1.5–4 |
| Physical State | Waxy solid | Liquid | Liquid to low melting solid (MP ≦ 80° C.) |

*Number OH groups/average molecule

In accordance with the present invention, the hydroxyl functional polyolefin intermediates, described above are reacted with excess equivalents of a polyisocyanate R (NCO)$_n$, where n is 2 to 4 and preferably 2.0 (i.e. diisocyanate), or mixtures of various di, triisocyanates, etc. such that n is from about 1.7 to about 2.3, and preferably from about 1.9 to about 2.1, and where R is aliphatic, aromatic, or combinations thereof (e.g., aliphatic substituted aromatics), having from 4 to 100 carbon atoms and preferably from 4 to 20 or 30 carbon atoms to produce an isocyanate terminated functionally reactive urethane prepolymer. At least about 1.8 equivalents and preferably from about 2 to about 8 equivalents of the polyisocyanate reactant are charged per equivalent of hydroxyl functional hydrocarbon polymer to produce the desired urethane prepolymer. Preferred aromatic diisocyanates include 4,4-methylene diphenyl isocyanate (MDI), as well as modified MDI known as Isonates (Dow Chemical), toluene diisocyanate (TDI) such as the 2,4-or 2,6-isomers, as well as mixtures thereof, 1,4-phenylene diisocyanate, m- and p-xylenene diisocyanates (XDI), and the like. Preferred aliphatic diisocyanates include 1,6-hexane diisocyanate, mixed trimethylhexane diisocyanate (TMI), isophorone diisocyanate (IPDI), and the like. An example of a triisocyanate is Desmodur ® N-3300, an aliphatic polyisocyanate base upon hexamethylene diisocyanate. Whenever a triisocyanate is utilized, the amount thereof is very small, for example, up to 10 moles, based upon the number of moles of the blocked prepolymer. Mixtures of various polydiisocyanates can be used if desired.

Suitable blocking agents for blocking the isocyanate terminated urethane prepolymer are known to the art and to the literature and include various lactams having from 3 to about 12 carbon atoms, such as epsiloncaprolactam, propiolactam, dimethyl propiolactam, 2-pyrrolidone, gamma-valerolactam, epsilon-laurolactam, and the like. Another group of blocking agents include the various ketoximes having from about 3 to about 20 and desirably from 3 to about 15 carbon atoms such as: dimethyl-, methylethyl-, diisopropyl-, dicyclohexyl-ketoximine, benzophenone and the like. Various phenols, such as 4-hydroxy-(methyl) benzoate, methyl salicylate, ethyl salicylate, phenol, o-, m-, and p-cresol, nonyl-phenols, C$_{15}$H$_{27}$ phenols, and the like, containing from 3 to 20 carbon atoms can also be utilized. Various cyclic ureas having a total of from 3 to 12 carbon atoms such as trimethylene or tetramethylene urea can also be utilized. Various enamines having the formula

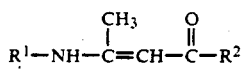

where R$^1$ and R$^2$, independently, is an alkyl having from 1 to 4 carbon atoms can also be utilized. Another group of blocking agents are the various dicarbonyl compounds having the general formula

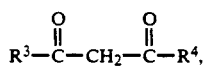

where R$^3$ and R$^4$, independently, is an alkyl having from 1 to 6 carbon atoms, phenyl, or R$^5$O, where R$^5$ is hydrogen or an alkyl having from 1 to 12 carbon atoms such as: acetylacetone, diethylmalonate, dimethylmalonate, acetylethyl acetate, and the like. Still other blocking agents include benzotriazole, the various phenylimidazoles, and the like. The amount of blocking agent utilized should generally be an approximate equivalent ratio of NCO/blocking agent of from about 0.5 to 2.0 and preferably from about 0.9 to about 1.1. Preferred blocking agents include caprolactam and the various ketoximes.

An important aspect of the present invention is the use of crosslinking agents to obtain improved physical properties such as abrasion resistance. The various crosslinking or curing agents which can be utilized include those containing —NH$_2$, —NHR$^6$, etc. groups, where R$^6$ is an alkyl having from 1 to 4 carbon atoms, —OH, or —SH groups, and the like, which react with the blocked or unblocked isocyanate groups of the urethane prepolymer upon heating. Such crosslinking or curing agents are known to the art and to the literature. Particularly preferred curatives or crosslinking agents comprise aliphatic, primary or secondary di-, tri-, and tetra-functional amines having a boiling point above about 100° C. and preferably above 180° C. Useful amine crosslinking agents include, for example, polyoxypropylene- or polyoxy(propylene/ethylene)-based primary di- and triamines sold by Texaco Chemical Company under the tradename "Jeffamine," which are herein fully incorporated by reference, such as T-403 (triamine; MW about 480), EDR-148 (diamine; MW about 150), T-3000 (triamine; MW about 3,000), T-5000 (triamine; MW about 5,000), D-230 (diamine; MW about 200), D-400 (diamine; MW about 400), or D-2000 (diamine; MW about 2,000). Other crosslinking agents include polyamine resins containing amino end groups, sold by Henkel Corporation under the tradenames "Versamid" or "Genamid," which are hereby fully incorporated by reference, such as Versamids 100, 115, 125, 140, 150, 250, or Genamids 250, 747, 2000, and the like. Still other useful amine curatives include isophoronediamine (Huels Co.), mixed trimethylenediamine (TMD; Huels Co.), N,N'-diaminoethylpiperazine, N-aminoethylpiperazine, 1,4-cyclohexanediamine, 1,6-hexanediamine, 1,4-butanediamine, diethylenetriamine, m- or p-xylylenediamine, ethylenediamine, liquid poly(dimethylsiloxane)-diamine; various aromatic di- or triamines, which are liquid, or low melting, soluble or dispersible in the coating mixture, such as a ring methylated phenylenediamine (RDX-66884, sold by Interez Co.) or poly(tetramethylene oxide)-bis-(4-aminobenzoates) (Polyamine-650 and -1000 sold by Air Products), and the like.

Other useful crosslinking agents include polyols (diols, triols or tetrols) having a number average molecular weight of from about 200 to about 1,000, which may be used either alone or in combination with diamines, and generally have a total of from 2 to about 100 carbon atoms. Desired polyols have primary hydroxyl groups, as well as tertiary, secondary or primary amino groups in their structures, such as triethanolamine, diethanolamine or ethanolamine. Curatives with two or more sulfuryl groups or combinations of NH$_2$, OH and SH can also be utilized.

The ratio of blocked isocyanate groups to curative groups (—NH$_2$, —NHR$^6$, —OH, or —SH) is generally from about 0.8 to infinity, that is, where no curing agent is utilized, desirably from about 1 or 2 to about 20, 30, or 50, more desirably from about 2 to about 10 or from about 2 to about 4, preferably from about 0.8 to about 3.8, and on some occasions, from about 0.8 to about 2.0, and preferably from about 1.0 to about 2.0. Shelf life of coatings containing a crosslinking agent, such as polyamine, is at least about two weeks at ambient temperatures.

Although curing of blocked polyurethanes with a polyamine curing agent normally does not require an added catalyst, urethane curing catalysts can be utilized, especially if polyols are used as curatives. Such catalysts are well known to the art and to the literature and include, for example, stannous octoate, various tin catalysts such as dioctyltin dilaurate, dibutytin dilaurate, etc., and various tertiary amines. Advantageously, these catalysts are added during the preparation of the isocyanate terminated hydrocarbon polyols to assist in the formation of the isocyanate terminated prepolymer and/or to facilitate the blocking of the isocyanate groups. The amount of the catalyst is generally from about 0.1 percent to about 5 percent catalyst by weight based upon the total amount, by weight, of reactants which form the blocked polyurethane.

Cure, that is, crosslinking of the prepolymers as well as other reactions, is generally carried out at from about 20° C. to about 255° C., desirably from about 160° C. to about 250° C., and preferably from about 170° C. to about 230° C.

In accordance with the present invention, variable amounts of silicone oil are added to the composition or mixture of blocked polyurethane prepolymer and crosslinking agent. Silicone oils are low molecular weight liquids or fluid silicone polymers and generally have a silicone backbone structure comprising alternate silicon and oxygen atoms with the generalized structure

where R*, independently is an alkyl group having from 1 to 4 carbon atoms and preferably is methyl, and "n" is from 2 to about 5,000. The silicon polymer can also contain minor amounts, that is up to about 40 percent, or up to 10 percent of repeating units such as fluoroalkyl (1 to 4 carbon atoms), or phenyl, as well as substituted hydrogen, chlorine or alkoxy (1 to 4 carbon atoms) groups. Suitable silicone oils in accordance with the present invention have a viscosity from about 0.5 centistokes to about 2,500,000 centistokes and preferably from about 500 to about 1,000,000 centistokes. Preferred silicone oils are linear polydimethylsiloxanes, with trimethylsiloxy terminated polysiloxanes and derivatives thereof being most preferred. Silicone oils are added to the blocked polyurethane and crosslinked mixture at levels from about 1 part to about 100 parts per 100 parts by weight blocked polyurethane, and preferably from about 5 parts to about 80 parts per 100 parts of blocked polyurethane.

The blocked polyurethane prepolymer may be prepared by first mixing a hydroxy terminated polyolefin, such as hydrogenated hydroxy terminated polybutadiene with dry toluene. A catalyst, such as dibutyltin dilaurate, may be added, if desired. The dried hydroxypolyolefin solution is added slowly to a solution of diisocyanate in anhydrous toluene over a time period of about 0.5 to 2 hours, under nitrogen, while vigorously agitating the resulting mixture at temperatures of about 100° C. to about 120° C. Agitation can continue until the isocyanate content reaches approximately the calculated theoretical level. Thereafter, a blocking agent is added to the mixture and allowed to react with the terminal NCO groups. The blocking reaction may be monitored by transmission IR or by titration of the NCO with dibutylamine.

The resulting blocked polyurethane prepolymer solutions are compounded with silicone oil and a crosslinking agent to form the thermosetting polymeric binder, in accordance with the present invention. Compounding additives, such as micropowders of fumed silica, nylon, polyethylene, Teflon, polystyrene, molybdenum disulfide, glass beads, and the like, which serve as fillers to control viscosity and provide a flat, non-glossy appearance, proper hardness and toughness, to the applied cured coating film may be added to the polymeric binder mixture. Micropowders may be added on a weight basis, from about 5 to about 60 parts per 100 parts, by weight, of organic coating components (binder). Toluene, xylene, and/or 1,1,1-trichloroethane can be added, if desired, to provide minor adjustments to suit the individual coating process used to apply the coating to the substrate. Pigments such as carbon black, titanium dioxide, or similar color opacifying pigments may be added if desired.

The resulting compounded coating can be applied directly to EPDM or similar elastomeric substrate without first applying a primer coating, i.e. free of a primer coating or otherwise pre-treating the substrate surface. A primer is generally considered to be a surface treatment which enhances the adhesion of a top coat to a substrate. Application of the coating of the present invention can be by dip coating or other suitable application method. The applied coating is heated for a time sufficient to cure the coating, typically around four minutes at temperatures above about 120° C., and preferably between about 170° C. and 230° C. The appearance of the cured coating film is uniform and homogeneous. A non-uniform appearance would indicate a phase separation and unacceptable film, as is often the case with unsatisfactory prior art compositions. Cured films of this invention can be rubbed with acetone without removing any coating, which indicates a completely cured and crosslinked polymeric binder, as well as good dispersion of silicone oil in the cured coating matrix.

According to the present invention, unexpected results have been obtained with regard to abrasion resistance. Specifically, the abrasion resistance, as determined by the crockmeter abrasion resistance test, was generally above 5,000 cycles, desirably above 10,000 cycles, more desirably above 15,000 cycles, and preferably above 20,000 and even 25,000 and 30,000 cycles.

The coating composition of the present invention may be applied either before, concurrently with, or after vulcanization of the EPDM substrate. The resulting cured coating or film exhibits a hard surface having very high abrasion resistance and a low friction coefficient, as well as the other desirable cured film properties previously mentioned. Subsequent operations, such as die cutting at elevated temperatures do not degrade the cured film. In addition to utilization as a coating on an automotive glass run channel, the coating compositions of the present invention are generally useful to reduce friction, as well as to improve resistance to weather, heat, ozone, ultraviolet light, marring of surfaces, and the like, and thus can be utilized in windshield wipers, upholstery, engine mounts, luggage, and the like.

The coating composition of the present invention will be better understood by reference to the following illustrative examples which do not serve to limit the scope of the invention.

EXAMPLES

Preparation of Blocked Urethane Prepolymers (Resin I)

Solution A Preparation

Into a 2-liter reaction flask equipped with an air-driven stirrer was charged toluene (550 ml). Under dry nitrogen gas atmosphere, 108 ml toluene was distilled off to eliminate water. 52 g methylene diphenyl diisocyanate (MDI, 208 moles) was mixed with the dry toluene to give Solution A.

Solution B Preparation

Into another 2l-liter reaction flask, equipped with a stirrer, was charged 218.8 g Polytail H (100 moles; 200 meq. OH) and 600 ml toluene. Polytail H (Mitsubishi Chem. Ind.) is a hydroxy-terminated polybutadiene which is ~100% hydrogenated. Its approximate structure is:

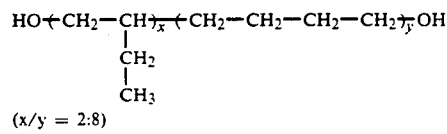

(x/y = 2:8)

The distributions of the (x) and (y) moieties are mostly random and the compound, on the average, contains about 2.3 hydroxyl groups per molecule.

The mixture was stirred for 1 hour at 105°–110° C., under dry nitrogen gas flow, and 150 ml toluene was distilled off to azeotrope off the water. The solution was mixed with 6 ml DABCO T-12 (dibutyltin dilaurate from Air Products) to give Solution B.

Capping The Hydrocarbon Polyol with MDI

Solution B was dropped into Solution A during 1.5 hours (under dry nitrogen gas flow) with vigorous agitation at 105°–110° C. The mixture was kept at 70° C. overnight with slow stirring and dry nitrogen gas flow, after which the isocyanate content was determined to be 0.185 meq./g (in agreement with the calculated amount).

Blocking of the Isocyanate Group with Caprolactam

A total of 23 g (228 moles) of caprolactam was added to the mixture and refluxed for 3 hours. The caprolactam blocking reaction was monitored by transmission IR.

Analysis and Characterization of the Coating Resin

The reaction product (polyolefin diol/MDI/caprolactam) was analyzed by NMR, HPGPC and DSC. The peak molecular weight was ~8,000, which indicated that the average repeating unit l(n) of [(Polytail H)-(MDI)] is about 2 in structure (I).

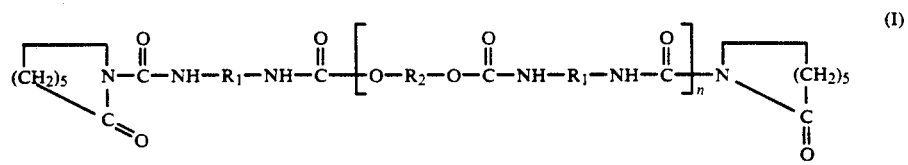

(I)

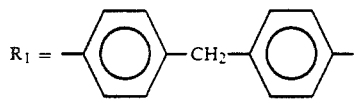

$R_2$ = hydrocarbon diradical of polyolefin diol.

There was a by-product with molecular weight ~500. It was identified as:

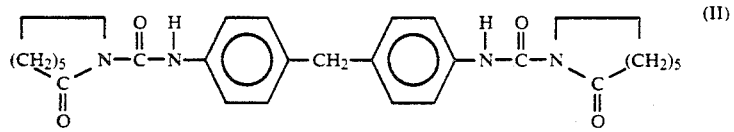

This is MDI with both isocyanate groups blocked with caprolactam, structure (II). The final reaction mixture was a solution of 29% solids in toluene.

A portion of the reaction mixture (278 g) was heated under dry nitrogen flow at 70°-90° C. for ~3 days to drive off the solvent and isolate a sample of the solid product. 80 g of rubbery material (Resin I) was obtained.

HPGPC analysis indicated no change of the molecular weight distribution of the product (Resin I) before and after the above mentioned heat stripping of solvent. This suggested that Resin I is stable at about 90° C. for more than 3 days.

Using the same procedure set forth hereinabove, 2-butanone oxime-blocked resin was prepared from Polytail H capped with MDI. The resin structure of the products was very similar to Resin I except for the blocking agent.

Preparation of Control (Resin II)

Another resin (Resin II, i.e., a control) was also prepared by capping a non-hydrocarbon, that is polycaprolactone polyester polyol (Tone Polyol, molecular weight ~2,000; hydroxy content 1.0 meq./g, Union Carbide) with MDI and blocking the free isocyanate groups with caprolactam. The synthesis method was very similar to that used for Resin I. Analysis by NMR, HPGPC and DSC indicated the following structure: (caprolactam)-(MDI)-[(Tone-polyol)-(MDI)]$_n$-(caprolactam)(III). The peak molecular weight distribution was ~8,200, indicating the average n value to be ~2.

II. SILICONE OIL COMPATIBILITY

Example

The mixtures A, B, C, D, E and F in Table I were prepared by mixing with a magnetic stirrer and heating at ~60° C. Silicone oil phase separation of the mixtures was examined visually after cooling to room temperature. A, B, C and E did not show any phase separation after 2 weeks storage at room temperature. Samples D and F did not show any phase separation in 2 days; however, in 2 weeks a transparent phase was observed at the bottom. The appearance of sample A was water-clear at ≧30° C. and slightly turbid at 25° C. Samples B, C, D, E and F (fumed silica added) were translucent. The above mentioned test results are set forth in Table I.

COMPARISON EXAMPLES (POLYESTER INTERMEDIATE)

The mixtures G, H, Q and R in Table II were likewise prepared by mixing with a magnetic stirrer and heating at ~60° C. Phase separation of the mixtures was examined visually after cooling to room temperature. Sample H showed phase separation in 30 minutes after the magnetic stirring was stopped. Samples I, J, K, L and M showed phase separation within 1 day. Samples N, O, P and Q were not clear after a few days; however, they clearly showed a transparent phase in 2 weeks. Samples Q and R did not show any phase separation after 2 weeks. The above mentioned test results are set forth in Table II.

Coating Appearance

A piece of EPDM rubber glass run channel was dip-coated with each of the mixtures in Table I. The appearance of the coatings during air drying was visually observed. All the mixtures (Resin I) of B, C, D, E and F dried to form a flat and uniform coating. The mixture A was uniform but shiny. The above mentioned test results are shown in Table I.

COMPARISON EXAMPLES (POLYESTER INTERMEDIATE)

A piece of EPDM rubber glass run channel was likewise dip-coated with each of the mixtures in Table II. The appearance of the mixtures during air drying was visually observed. Samples H, I, J, K, L and M (Resin II) dried to an inhomogeneous coating containing shiny spots with 1-2 mm diameter. This spotting is clear evidence of the phase separation of silicone oil. However, mixtures of N, O, P and Q (high silica level versions of J, K, L and M, respectively) dried to a flat and uniform coating. However, coatings from samples N, O, P and Q had very low strength. Table II shows that these samples also have poor abrasion resistance. A, G and R, which had no silicone oil, dried to form a shiny and smooth coating. The above mentioned test results are shown in Table I or Table II.

III. COATING CURE CONDITIONS

Each piece of EPDM rubber glass run channel, which was dip-coated with the mixtures, was heated at 200° C. for 4 minutes in an air oven. The heated coatings were rubbed with acetone-soaked paper towel immediately after the heating. The paper towel was visually examined to detect evidence of lack of cure. The results are as follows.

Coatings A, B, C, G, H and I (no cross-linking agent added) and coatings K, L, M, O, P and Q (low molecular weight amine crosslinking agent added) showed stains using the acetone wipe test. The staining indicates incomplete cure of the coatings. None of the coatings containing amine-terminated polymeric crosslinking agents (e.g., compounds D, E, F, J, N and R) showed staining, indicating complete cure. Coatings of compounds D, E and F (Resin I) remained flat and smooth after the wipe test; however, coatings of compounds J and N lost the silicone oil from the 1-2 mm diameter spots on the surfaces. The above mentioned test results are shown in Table I or Table II.

IV. TESTS OF ABRASION AND FRICTION COEFFICIENT (i) A sponge bulb or a piece of uncoated EPDM rubber weatherstrip for an automobile was spray-coated with the mixture E in Table I, heated at 200° C. for four minutes in a hot air oven. The coated sponge bulb was tested on a Weizenbeek abrasion resistance tester at 60 cycles per minute and 3 pounds load. The abrasion resistance was 25,500 cycles; the coating thickness was $\leq 5$ μm measured by an optical microscope. The abrasion resistance was ~20 cycles without the coating.

(ii) A piece of uncoated EPDM rubber glass run channel was directly brush-coated with the mixture of 100 parts 2-butanone oxime blocked Polytail H (capped with MDI), 300 parts toluene, 400 parts 1,1,1-trichloroethane, 20 parts silicone oil (Union Carbide L-45), fumed silica (Degussa TS100), 14 parts nylon powder (400 mesh; Rilsan (0), and 9.6 parts Jeffamine T403 (Texaco Chemical Co.). The coated EPDM rubber glass run channel was heated at 130° C. for five minutes in an air oven. The coating appearance was flat and uniform. The crockmeter abrasion resistance was 34,000 cycles and the coating thickness was 29 m. The coating showed no abrasion after 3,000 cycles on the crockmeter abrasion tester, when mud was sprayed at the beginning and every 1,000 cycles, where the mud is prepared by mixing 3 parts water and 1 part dust (Type 1-0.25 parts; Type 2-0.75 parts (JIS-Z-8901). It is demonstrated that the coating of this invention reinforced with a higher level of fumed silica and nylon powder is tough enough to resist sharp edges (e.g., of sands).

(iii) A piece of uncoated EPDM rubber glass run channel was sand-blasted on the surface at 40 psi, then sand wiped off with toluene, brush-coated with 5 percent benzophenone in toluene, UV irradiated, and spray-coated with coating E. The coated glass run channel was heated in an air oven at 200° C. for 4 minutes. The appearance of the coating was flat, smooth, uniform and black without any indication of separation of silicone oil. The cured coating was tested using a modified crockmeter abrasion tester, in which a glass edge slides at a 3 kg load at 66 Hz on a given test specimen. The glass edge was reground at every 5,000 cycles with No. 4 sandpaper. This crockmeter tester is equipped with a sensor to measure force or friction. The failure of the crockmeter test was determined at the cycle at which the friction coefficient went beyond 0.38. The test was repeated at least twice.

The coating thickness was measured using an optical microscope after the crockmeter abrasion test. The results of the crockmeter abrasion test and thickness measurement are shown in Table III together with reference data for comparison. The reference samples were EPDM rubber glass run channels coated with a urethane coating containing silicone oil.

No coating debris was observed for samples 1 and 2 during and after the crockmeter test. The microscopic measurement of samples 1 and 2 indicated almost no difference in the coating thickness between the coating which contacted the glass abrader versus the uncontacted area.

On the other hand, coating debris was observed for all of the reference samples during and after the crockmeter test. The glass edge penetrated the coating layers to the EPDM rubber substrate before the failure of the crockmeter test for all the reference samples.

A piece of EPDM glass run channel coated with mixture E was heated to 150° C. in an air oven and manually rubbed with the glass edge (used for the crockmeter test) with $\geq 5$ kg load while in the hot air oven. There was no streak mark after the rubbing.

A piece of EPDM glass channel kept on a laboratory bench for two months was directly spray-coated with compound E, heated at 200° C. for 4 minutes and tested on the crockmeter. No coating debris and no adhesion failure were observed at 10,000 cycles. This indicated that high abrasion resistance can be achieved without surface treatment of EPDM substrate that has been stored for a long period of time. Previously, it was observed that glass run channels develop a surface bloom with time. Using more polar coatings such as Versikote, it is necessary to thoroughly clean the surface to get good adhesion. Versikote is an abrasion resistant coating containing a blend of a polyether and/or a polyester with a silicon oil and is manufactured by GenCorp.

Mixtures with high silica content and Resin II (N, O, P and Q) became flat and uniform coatings after heating at 200° C. for 4 minutes; however, their strength was so low that the coatings were abraded even by fingernail rubbing.

Table III shows that the coating invented in the present work has the best abrasion resistance among the available coatings for EPDM glass run channels.

TABLE I

| Mixture: | A | B | C | D | E | F |
|---|---|---|---|---|---|---|
| Ingredients (parts by weight) | | | | | | |
| Resin I (Invention) | 100 | 100 | 100 | 100 | 100 | 100 |
| Toluene | 900 | 900 | 900 | 900 | 900 | 900 |
| Silicone Oil (Union Carbide L-45) | 25 | 15 | 20 | 20 | 20 | 20 |
| Fumed Silica (Degussa TS-100) | — | 8 | 8 | 8 | 8 | 8 |
| Jeffamine ED600 (polyoxyethylenediamine) | — | — | — | 6.5 | — | — |
| Jeffamine T403 (polyoxypropylenetriamine) | — | — | — | — | 3.2 | — |
| Genamid 747 (polyamidediamine) | — | — | — | — | — | 2.3 |

TABLE I-continued

| Mixture: | A | B | C | D | E | F |
|---|---|---|---|---|---|---|
| Silicone Oil Phase Separation | | | | | | |
| Phase Separation Occurrence | >14 days | >14 days | >14 days | 2-14 days | >14 days | 2-14 |
| Appearance During Drying on Substrate | Uniform | Uniform | Uniform | Uniform | Uniform | Uniform |
| State of Cure After Heating at 200° C. for 4 min. | Incomplete | Incomplete | Incomplete | Complete | Complete | Complete |
| Coating Appearance After Heating at 200° C. for 4 min. | Uniform Shiny Black | Uniform Flat Black | Uniform Flat Black | Uniform Flat Black | Uniform Flat Black | Uniform Flat Black |
| Crockmeter Abrasion Resistance | Poor* | Poor* | Poor* | ≧20,000 | ≧30,000 | ≧10,000 |

*Less than 5,000

TABLE II

| Mixture: | G | H | I | J | K | L |
|---|---|---|---|---|---|---|
| Ingredients (parts by weight) | | | | | | |
| Resin II (Control) | 100 | 100 | 100 | 385 | 385 | 385 |
| Toluene | 900 | 900 | 900 | 900 | 900 | 900 |
| Silicone Oil (Union Carbide L-45) | — | 25 | 15 | 21 | 42 | 21 |
| Fumed Silica (Degussa TS-100) | — | — | 8 | 7 | 7 | 7 |
| Genamid 747 (polyamidediamine) | — | — | — | 44 | — | — |
| Jeffamine ED148 (polyoxyethylenediamine) | — | — | — | — | 27 | — |
| Trimethylhexamethylenediamine | — | — | — | — | — | 25 |
| Silicone Oil Compatibility | | | | | | |
| Phase Separation Occurrence | — | <30 min. | <1 day | <1 day | <1 day | <1 day |
| Appearance During Drying on Substrate | — | Shiny Greasy Spots | Shiny Greasy Spots | Shiny Greasy Spots | Shiny Greasy Spots | Shiny Greasy Spots |
| State of Cure After Heating at 200° C. for 4 min. | Incomplete | Incomplete | Incomplete | Complete | Incomplete | Incomplete |
| Coating Appearance After Heating at 200° C. for 4 min. | Uniform Shiny | Non-Uniform | Non-Uniform | Non-Uniform | Non-Uniform | Non-Uniform |
| Crockmeter Abrasion Resistance | — | Poor* | Poor* | Poor* | Poor* | Poor* |

| Mixture | M | N | O | P | Q | R |
|---|---|---|---|---|---|---|
| Ingredients (parts by weight) | | | | | | |
| Resin II (Control) | 385 | 385 | 385 | 385 | 385 | 385 |
| Toluene | 900 | 900 | 900 | 900 | 900 | 900 |
| Silicone Oil (Union Carbide L-45) | 81 | 81 | 162 | 81 | 81 | — |
| Fumed Silica (Degussa TS-100) | 27 | 46 | 46 | 46 | 46 | — |
| Genamid 747 (polyamidediamine) | — | 11.5 | — | — | — | 11.5 |
| Jeffamine ED148 (polyoxyethylenediamine) | — | — | 7.0 | — | — | — |
| Trimethylhexamethylenediamine | — | — | — | 6.4 | — | — |
| 1,3-bisaminomethylcyclohexane | 7.4 | — | — | — | 7.4 | — |
| Silicone Oil Compatibility | | | | | | |
| Phase Separation Occurrence | <1 day | 2-14 days | 2-14 days | 2-14 days | >14 days | >14 days |
| Appearance During Drying on Substrate | Shiny Greasy Spots | Flat Uniform | Flat Uniform | Flat Uniform | Flat Uniform | Shiny Uniform |
| State of Cure After Heating at 200° C. for 4 min. | Incomplete | Complete | Incomplete | Incomplete | Incomplete | Complete |
| Coating Appearance After Heating at 200° C. for 4 min. | Non-Uniform | Flat Uniform Whitish | Flat Uniform Whitish | Flat Uniform Whitish | Flat Uniform Whitish | Shiny Uniform Black |
| Crockmeter Abrasion | Poor* | Very** Poor | Very** Poor | Very** Poor | Very** Poor | — |

TABLE II-continued

Resistance

*Less than 5,000 cycles
**Less than 1,000 cycles

TABLE III

| Sample Number | Coating Sample | Initial Friction Coefficient | Crockmeter Abrasion Resistance (Cycles) | Thickness (μm) | Abrasion Resistance Index (Cycles/μm) |
|---|---|---|---|---|---|
| 1 | Present Invention | 0.095 | 30,000 | 15.5 | 1935 |
| 2 | Present Invention | 0.095 | 29,500 | 11.5 | 2565 |
| 3 | Nova Nummi[1] | 0.190 | 15,000 | 24.0 | 625 |
| 4 | Nova Nummi[1] | 0.113 | 30,000 | 24.0 | 1250 |
| 5 | Nova Nummi[1] | 0.113 | 30,000 | 24.0 | 1250 |
| 6 | Mazda CT20 | 0.208 | 11,900 | 26.7 | 446 |
| 7 | Mazda CT20 | 0.208 | 15,400 | 26.7 | 577 |
| 8 | Mazda CT20[2] | 0.038 | 13,384 | 50.0 | 246 |
| 9 | Mazda CT20[2] | 0.038 | 11,210 | 50.0 | 238 |

[1]Nova Nummi is a polyether-ester polyurethane and contains a primer.
[2]coating is polyether-polyester urethane and contains a primer As apparent from the above examples and data, the coating composition of the present invention yielded coatings with outstanding abrasion resistance and low friction as compared to the coating compositions of the prior art.

Resin IA (Hydroxy-terminated Crosslinking Agent)

A resin (resin IA) was prepared in the same way as resin I except it was scaled up to 20 times of I. Resin IA was used for the evaluation of a hydroxy-terminated crosslinking agent for the coating of EPDM glass run channels. One hundred (100) parts of Resin IA, 2.7 parts of 2-ethyl-2-hydroxymethyl-1,3-propanediol (Formrez T-279; Witco Corp.), 8 parts of fumed silica (Degussa TS-100), 20 parts of silicone oil (Union Carbide L-45), 900 parts of toluene, and 1.5 parts dibutyltin dilaurate (Dabco T-12 from Air Products Co.) were mixed with a magnetic stirrer and heated for 3 hours at ~40° C. The mixture was brush-applied to an uncoated EPDM rubber glass run channel and heated at 200° C. for 4 minutes in a hot air oven. The average dry thickness of the coating was 15.6 microns from the microscopic measurement. The appearance of the coating was flat and black. The acetone-soaked paper towel test did not show stain, demonstrating total coating cure. The crockmeter abrasion test with 3 kg load and 60 cycles per minute showed >20,000 cycles. There was no debris left after the crockmeter test. These test results indicate that hydroxy-terminated crosslinking agents are useful for the coatings of this invention along with the various amine terminated crosslinking agents.

COMPARATIVE EXAMPLE UTILIZING JAPANESE PATENT APPLICATION 59-201,838 COMPOSITION (NO CROSSLINKING AGENT)

One hundred parts of Polytail H, 18 parts of ε-caprolactam-blocked hexamethylene diisocyanate (prepared in-house), 33 parts of silicone oil (L-45 ®, Union Carbide), 9.3 parts of Degussa TS100 (fumed silica), and 1058 parts of toluene were mixed with a magnetic stirrer for four hours. The mix was brush-applied to a piece of EPDM glass run, dried and heated at 200° C. for 20 minutes or at 150° C. for 3.5 hours. The coated samples were tested on a crockmeter abrasion tester at 3 kg load and 60 cycles per minute. Both samples failed at ≦600 cycles.

One hundred parts of Polytail H. 40 parts of methylethyl ketoxime-blocked triisocyanatohexyl isocyanurate (cyclic trimer of hexamethylene diisocyanate: Desmodur ® BL-3175 from Mobay Corp.), 1 part of Dabco ® T-12 (Air Products Chem. Inc.), and 1260 parts of toluene were mixed with magnetic stirrer at 40° C. for 4 hours. To this solution was added 20 parts of silicone oil (L-45 ®, Union Carbide) and 10 parts of Degussa TS100, which was mixed with a magnetic stirrer for four hours. A piece of EPDM glass run channel was brushcoated with the above-prepared mix and heated at 200° C. for 4 minutes and tested with a crockmeter abrasion tester at 3 kg and 60 cycles per minute. The sample failed at less than 1000 cycles in 3 tests.

The stoichiometric ratios of the OH groups of Polytail H and blocked NCO groups of the above two comparative examples are 1:1. From both comparative examples it is obvious that systems of Polytail H and blocked polyisocyanate do not produce good quality coatings of EPDM glass run channels.

While in accordance with the Patent Statutes, the best mode and preferred embodiment has been set forth, the scope of the invention is not limited thereto, but rather by the scope of the attached claims

What is claimed is:

1. A heat curable, solvent-based, primerless, one-part, storage-stable composition, comprising:

a blocked polyurethane prepolymer, the precursor polyurethane prepolymer being the reaction product of a hydroxyl functional hydrogenated polydiene or polyolefin intermediate with at least 1.8 equivalents of a polyisocyanate for each equivalent of said hydroxyl functional hydrocarbon intermediate, said hydrogenated polydiene or polyolefin having greater than 1.5 hydroxyl groups per average intermediate molecule and a number average molecular weight of from about 500 to about 15,000, and said precursor polyurethane prepolymer being blocked with a blocking agent;

a crosslinking agent, said crosslinking agent having —$NH_2$, —$NHR^6$ where said $R^6$ is an alkyl having from 1 to 4 carbon atoms, —OH, or —SH curing groups, the amount of said crosslinking agent being such that the ratio of blocked isocyanate groups to said curative groups is from about 0.8 to about 50, and from about 1 to about 100 parts by weight of silicone oil per 100 parts by weight of said blocked polyurethane prepolymer.

2. A composition according to claim 1, wherein said polyisocyanate has a formula $$R\text{-}(NCO)_n$$

wherein n is 2, 3, or 4 and R is aromatic, aliphatic, or combinations thereof, having form 4 to 100 carbon atoms, and wherein said hydroxyl functional hydrogenated polydiene or polyolefin is made by polymerizing an olefin monomer having from 2 to 6 carbon atoms, or a diene monomer having from 4 to 10 carbon atoms, and optionally, up to 50 mole percent of an ethylenically unsaturated comonomer, and optionally wherein said hydrogenated diene polymer is at least 50 mole percent hydrogenated.

3. A composition according to claim 2, wherein said crosslinking agent having $-NH_2$ or $-NHR^6$ groups is an aliphatic primary or secondary di, tri, or tetra-functional amine having a boiling point of at least 100° C., wherein said hydroxyl functional hydrogenated diene polymer is at least 95 mole percent hydrogenated, wherein R of said polyisocyanate has from 4 to 30 carbon atoms and wherein the viscosity of said silicone oil is from about 0.5 to about 2,500,000 centistokes.

4. A composition according to claim 3, wherein the equivalent ratio of said blocked isocyanate groups to said curative groups of said crosslinking agent is from about 2.0 to about 10.0, and wherein the equivalent ratio of said polyisocyanate to said hydroxyl functional hydrogenated diene polymer or polyolefin is from about 2.0 to about 8.0, the equivalent ratio of said polyisocyanate to said blocking agent being from about 0.5 to about 2.0, wherein the molecular weight of said hydroxyl functional hydrogenated diene polymer or polyolefin is from about 1,000 to about 8,000, wherein said hydroxyl functional hydrocarbon intermediate has from about 1.8 to about 6.0 hydroxyl groups per average intermediate molecule, wherein said polyisocyanate is 4,4-methylene diphenyl isocyanate, 2,4-toluene diisocyanate, 2,6-toluene diisocyanate, or 1,4-phenylene diisocyanate, or mixtures thereof.

5. A composition according to claim 4, wherein the equivalent ratio of said NCO groups to said blocking agent is from about 0.9 to about 1.1, wherein the molecular weight of said hydroxyl functional hydrocarbon intermediate is from about 1,000 to about 8,000, wherein said hydroxyl functional hydrogenated polydiene or polyolefin has the approximate formula $$HO\text{-}(CH_2\text{-}CH)_x\text{-}(CH_2\text{-}CH_2\text{-}CH_2\text{-}CH_2)_y\text{-}OH$$
$$\quad\quad\quad\quad |$$
$$\quad\quad\quad\quad CH_2$$
$$\quad\quad\quad\quad |$$
$$\quad\quad\quad\quad CH_3$$

wherein the x and y units are randomly distributed, wherein the x/y ratio is from 0.10 to about 10.0 and wherein the average number of OH groups per molecule is from about 1.5 to about 4.0, wherein said silicone oil has a backbone structure repeat unit of $$(-SiR^*_2O-)$$

wherein $R^*$ is methyl, wherein said silicone oil has a viscosity of from about 500 to about 1,000,000 centistokes, and wherein the amount of said silicone oil is from about 5 parts to about 80 number of OH groups per molecule is from about 1.5 to about 4.0, wherein said silicone oil has a backbone structure repeat unit of $$(-SiR^*_2O-)$$

wherein $R^*$ is methyl, wherein said silicone oil has a viscosity of from about 500 to about 1,000,000 centistokes, and wherein the amount of said silicone oil is from about 5 parts to about 80 parts by weight per 100 parts by weight of said blocked polyurethane intermediate, wherein said polyisocyanate is 4,4-methylene diphenyl isocyanate, wherein said blocking agent is caprolactam or a ketoxime having from 3 to 20 carbon atoms, and wherein said crosslinking agent contains said $-NH_2$ or said $-NHR^6$ groups.

6. A cured thermoset composition comprising, the cured composition of claim 1.

7. A cured thermoset composition comprising, the cured composition of claim 3.

8. A cured thermoset composition, comprising the cured composition of claim 5.

9. A cured thermoset composition according to claim 6, wherein said composition has a crockmeter abrasion resistance of at least 5,000 cycles.

10. A cured thermoset composition according to claim 7, wherein said composition has a crockmeter abrasion resistance of at least 10,000 cycles.

11. A cured thermoset composition according to claim 8, wherein said composition has a crockmeter abrasion resistance of at least 20,000 cycles.

12. An elastomer substrate coated with the composition of claim 1.

13. An elastomer substrate coated with the composition of claim 4.

14. An elastomer substrate coated with the composition of claim 6.

15. An elastomer substrate coated with the composition of claim 8.

16. An elastomer substrate coated with the composition of claim 9.

17. An elastomer substrate coated with the composition of claim 11.

18. A process for making a heat-curable, solvent-based, primerless, one-part composition, comprising the steps of:

reacting a hydroxyl functional hydrogenated polydiene or polyolefin with at least 1.8 equivalents of a polyisocyanate for each equivalent of said hydrogenated polydiene or polyolefin to form a prepolymer, said hydrogenated polydiene or polyolefin having at least 1.5 hydroxyl groups per average molecule and a number average molecular weight of from about 500 to about 15,000, blocking said prepolymer to form a blocked prepolymer composition, adding a crosslinking agent to said blocked prepolymer composition, said crosslinking agent containing $-NH_2$, $-NHR^6$ where said $R^6$ is an alkyl having from 1 to 4 carbon atoms, $-OH$, or $-SH$ curing groups, the amount of said crosslinking agent being such that the ratio of blocked isocyanate groups to said curative groups is from about 8.0 to about 50, and adding from about to about 100 parts by weight of silicone oil per 100 parts by weight of said blocked polyurethane prepolymer.

19. The process according to claim 18, wherein said intermediate is a hydrogenated polydiene having the approximate formula

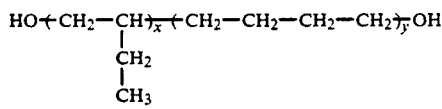

wherein the x and y units are randomly distributed, wherein the x/y ratio is from 0.10 to about 10.0 and wherein the average number of OH groups per molecule is from about 1.5 to about 4.0, wherein said silicone oil has a backbone structure repeat unit of

wherein R* is methyl, wherein said silicone oil has a viscosity of from about 500 to about 1,000,000 centistokes, wherein the amount of said silicone oil is from about 5 parts to about 80 parts by weight per 100 parts by weight of said blocked polyurethane intermediate, wherein said polyisocyanate is 4,4-methylene diphenyl isocyanate, 2,4-toluene diisocyanate, 2,6-toluene diisocyanate, or i,4-phenylene diisocyanate, or mixtures thereof, wherein said curing agent has $-NH_2$ or $-NHR^6$ groups and is an aliphatic primary or secondary di, tri, or tetra-functional amine having a boiling point of at least 100° C.

20. The process according to claim 18, including curing said prepolymer.

21. The process according to claim 19, including said curing said prepolymer at a temperature of from about 120° C. to about 250° C.

22. The process according to claim 18, including applying said composition to an elastomer substrate and curing said prepolymer composition thereon.

23. The process according to claim 19, including applying said composition to an elastomer substrate and curing said prepolymer composition thereon at a temperature of from about 125° C. to about 250° C.

24. A heat curable, primerless, composition useful as a low friction coating composition, comprising:

a blocked polyurethane prepolymer, the precursor polyurethane prepolymer being the reaction product of a hydroxyl functional hydrogenated polydiene or polyolefin intermediate with a polyisocyanate, said hydrogenated polydiene or polyolefin having greater than 1.5 hydroxyl groups per average intermediate molecule and a number average molecular weight of from about 500 to about 15,000, and said precursor polyurethane prepolymer being blocked with a blocking agent, an effective amount of a crosslinking agent to cure the composition, said crosslinking agent having $-NH_2$, $-NHR^6$ where said $R^6$ is an alkyl having from 1 to 4 carbon atoms, $-OH$, or $-SH$ curing groups, and from about 1 to about 100 parts by weight of silicone oil per 100 parts by weight of said blocked polyurethane prepolymer.

25. A composition according to claim 24, wherein said precursor polyurethane prepolymer is a reaction of a hydroxyl functional hydrogenated polydiene and a polyisocyanate wherein said polydiene has the approximate formula

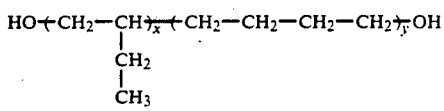

wherein the x and y units are randomly distributed, wherein the x/y ratio is from 0.10 to about 10.0 and wherein the average number of OH groups per molecule is from about 1.5 to about 4.0, wherein said polyisocyanate is 4,4l-methylene diphenyl isocyanate, wherein said blocking agent is caprolactam or ketoxime having from 3 to 20 carbon atoms, wherein said crosslinking agent contains said $-NH_2$ or said $-NH^6$ groups, wherein the equivalent ratio of said curative groups to said blocked isocyanate groups is from about 0.8 to about 50, and wherein said silicone oil has a backbone structure repeat unit of

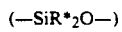

wherein R* is methyl, and wherein said silicone oil has a viscosity of from about 500 to about 1,000,000 centistokes.

26. An elastomer substrate coated with the cured coating composition of claim 1, wherein said substrate is a glass-run channel.

27. An elastomer substrate coated with the cured coating composition of claim 3, wherein said substrate is a glass-run channel for an automobile.

28. An elastomer substrate coated with the cured coating composition of claim 6, wherein said substrate is an EPDM glass-run channel for an automobile.

29. An elastomer substrate coated with the cured coating composition of claim 8, wherein said substrate is an EPDM glass-run channel for an automobile.

30. An elastomer substrate coated with the cured coating composition of claim 11, wherein said substrate is a sponge bulb weather strip.

* * * * *